US009699756B2

United States Patent
Austin et al.

(10) Patent No.: US 9,699,756 B2
(45) Date of Patent: Jul. 4, 2017

(54) METHODS, DEVICES, AND COMPUTER READABLE STORAGE DEVICES FOR COLLECTING AND REPORTING LOCATION DATA WITH A HIGH ACCURACY

(71) Applicant: AT&T Mobility II LLC, Atlanta, GA (US)

(72) Inventors: Mark Austin, Roswell, GA (US); Sheldon Kent Meredith, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 484 days.

(21) Appl. No.: 14/088,696

(22) Filed: Nov. 25, 2013

(65) Prior Publication Data

US 2015/0148056 A1 May 28, 2015

(51) Int. Cl.
*H04W 64/00* (2009.01)

(52) U.S. Cl.
CPC .......... *H04W 64/00* (2013.01); *H04W 64/006* (2013.01)

(58) Field of Classification Search
CPC . H04W 64/00; H04W 64/003; H04W 64/006; H04W 4/023; H04W 8/005; H04W 40/246; G01S 5/0284; G01S 5/0027; H04M 2250/02; H04M 2250/06; H04M 2250/10
USPC ........................................... 455/40.21, 456.1
See application file for complete search history.

(56) References Cited

U.S. PATENT DOCUMENTS

| | | | |
|---|---|---|---|
| 8,249,626 B2 | 8/2012 | Huston | |
| 8,285,254 B2 | 10/2012 | Chen | |
| 8,320,938 B2 | 11/2012 | Meyer et al. | |
| 2009/0181653 A1* | 7/2009 | Alharayeri | H04W 4/02 455/414.1 |
| 2010/0075645 A1 | 3/2010 | Yamamura et al. | |
| 2012/0016574 A1* | 1/2012 | Smartt | G08G 1/20 701/117 |
| 2012/0258730 A1 | 10/2012 | Tinnakornsrisuphap et al. | |
| 2012/0264446 A1 | 10/2012 | Xie et al. | |
| 2012/0289243 A1 | 11/2012 | Tarlow et al. | |
| 2012/0290311 A1* | 11/2012 | Tara | G01S 19/17 705/2 |
| 2013/0018629 A1 | 1/2013 | Sidhu et al. | |
| 2013/0045759 A1* | 2/2013 | Smith | H04W 64/00 455/456.6 |

(Continued)

OTHER PUBLICATIONS

Talasila et al. "Improving Location Reliability in Crowd Sensed Data with Minimal Efforts", Wireless and Mobile Networking Conference (WMNC), pp. 1-8 (Apr. 2013).

(Continued)

*Primary Examiner* — Thai Vu
(74) *Attorney, Agent, or Firm* — Hartman & Citrin LLC

(57) ABSTRACT

A mobile communication device collects and reports location data associated with itself and with mobile communication devices within a proximity. The mobile communication device determines its location and detects the presence of another communication device located within the proximity of the mobile communication device. The mobile communication device determines a location of the other mobile communication device. The mobile communication device reports its location and the location of the other mobile communication device.

16 Claims, 4 Drawing Sheets

(56) References Cited

U.S. PATENT DOCUMENTS

2013/0084889 A1    4/2013  Schmitt et al.
2015/0312744 A1*  10/2015  Leppanen ............ H04W 8/005
                                                        370/338

OTHER PUBLICATIONS

Scott, Logan "J911: Fast Jammer Detection and Location Using Cell-Phone Crowd-Sourcings", gpsworld.com/j911-fast-jammer-detection-10720, pp. 1-13 (Nov. 1, 2010).
Kansal et al. "Location and Mobility in a Sensor Network of Mobile Phones", http://research.microsoft.com/en-us/um/people/zhao/pubs/kansal_NOSSDAV07.pdf, 6 pp (2007).
Savvides et al., "Dynamic Fine-Grained Localization in Ad-Hoc Networks of Sensors," ACM SIGMOBILE, Jul. 2001.
Perry, Douglas, "GM Developing WiFi Direct-based Pedestrian Detection," Tom's Guide US, Jul. 29, 2012.

\* cited by examiner

METHODS, DEVICES, AND COMPUTER READABLE STORAGE DEVICES FOR COLLECTING AND REPORTING LOCATION DATA WITH A HIGH ACCURACY

TECHNICAL FIELD

The present disclosure relates generally to telecommunications, and, more particularly, to location detection and reporting.

BACKGROUND

Crowd sensing has become important for entities interested in marketing, security, event planning, etc. One manner in which crowd sensing may be performed is by sensing mobile communication devices located within a particular area and extrapolating the number of people in that area based on the number of mobile communication devices that are sensed in that area.

Currently, there are various approaches for determining the locations of mobile communication devices. Some approaches are network-based, such as triangulation. Network-based approaches provide location information for a high volume of mobile communication devices, but such approaches are not highly accurate. Other approaches are based on mobile communication devices individually determining their locations using, e.g., a Global Positioning System (GPS).

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment, a method is provided for collecting and reporting location data. The method comprises determining, by a first mobile communication device, a location of the first communication device, detecting the presence of a second mobile communication device located within a proximity of the first mobile communication device, and determining, by the first mobile communication device, a location of the second mobile communication device. The method further comprises reporting, by the first mobile communication device, the location of the first mobile communication device and the location of the second mobile communication device.

According to another embodiment, a mobile communication device is provided for collecting and reporting location data. The mobile communication device comprises a processor and a memory having stored thereon instructions which, when executed by the processor, cause the processor to perform operations. The operations include determining a location of the mobile communication device, detecting presence of another communication device located within a proximity of the mobile communication device, determining a location of the other mobile communication device, and reporting the location of the mobile communication device and the location of the other mobile communication device.

According to another embodiment, a computer-readable storage device is provided within a mobile communication device for collecting and reporting location data. The computer-readable storage device has instructions stored thereon which, when executed by a processor, cause the processor to perform operations. The operations include determining a location of the mobile communication device, detecting presence of another communication device located within a proximity of the mobile communication device, determining a location of the other mobile communication device, and reporting the location of the mobile communication device and the location of the other mobile communication device.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

According to illustrative embodiments, mobile communication devices equipped with location-tracking and presence-sensing capabilities may be used to collect location information from mobile communication devices within a given proximity and simultaneously report their locations and the locations of the mobile communication devices around them. In this manner, location information for a high volume of mobile communication devices may be collected in a short time with a high accuracy.

Figure 1:
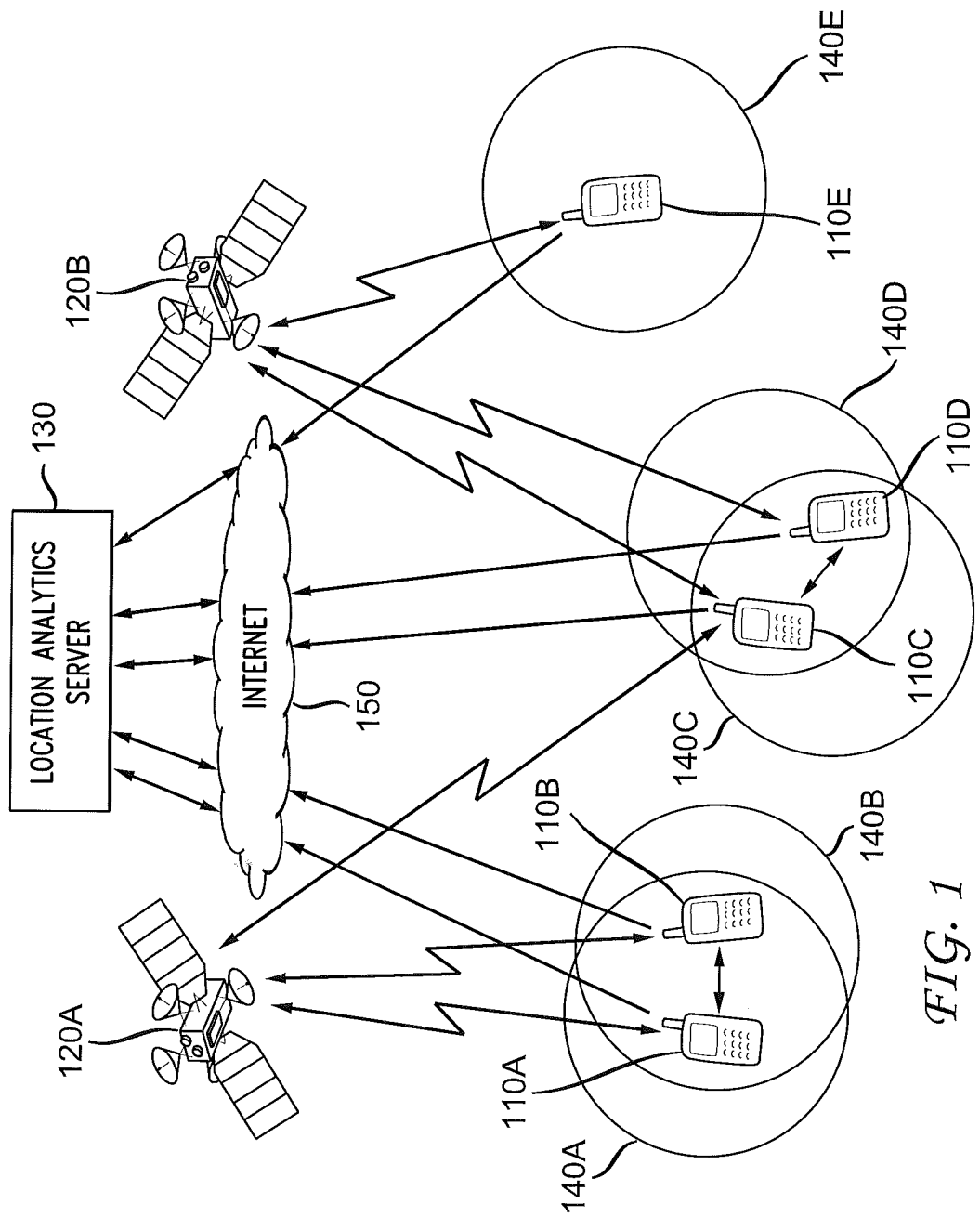
FIG. 1 illustrates an environment in which a system for collecting and reporting location information may be implemented according to an illustrative embodiment.

FIG. 1 illustrates an environment in which a system for collecting and reporting location information may be implemented according to illustrative embodiments. As shown in FIG. 1, mobile communication devices 110A, 110B, 110C, 110D, and 110E are in communication with a location analytics server 130 via a network 150, such as the Internet. According to one embodiment, the mobile communication devices 110A, 110B, 110C, 110D, and 110E may be implemented with a device such as that described below with respect to FIG. 2. The analytics server 130 may be implemented with a computing device, such as that described below with respect to FIG. 3.

The mobile communication devices 110A, 110B, 110C, 110D, and 110E are equipped with location-tracking capabilities so that their locations may be tracked. As shown in FIG. 1, the mobile communication devices 110A, 110B, 110C receive radio signals from a GPS satellite 120A, and the mobile communication devices 110C, 110D, and 110E receive radio signals from a GPS satellite 120B. It should be appreciated that while two GPS satellites 120A and 120B are shown for simplicity of illustration, the mobile communication devices 110A, 110B, 110C, 110D, and 110E may receive radio signals from several GPS satellites.

As those skilled in the art would appreciate, the radio signals transmitted from the GPS satellites 120A and 120B include information indicating the locations of the GPS satellites. The mobile communication devices 110A, 110B, and 110C, determine their locations by estimating the distance to the satellite 120A (and distances to other satellites from which radio signals may be received). Similarly, the mobile communication devices 110C, 110D, and 110E determine their locations by estimating the distance to the satellite 120B (and distances to other satellites from which radio signals may be received). By communicating with the GPS satellites 120A and 120B, the mobile communication devices 110A, 110B, 110C, 110D, and 110E are able to determine their respective locations with an accuracy of approximately 10 meters. This accuracy is a large improvement over network-based location tracking, which typically has an accuracy of 100+ meters.

While a GPS system is described herein as an example of a location system, it should be appreciated that other location systems may be used by the mobile communication devices 110A, 110B, 110C, 110D, and 110E.

Each of the mobile communication devices 110A, 110B, 110C, 110D and 110E determines and reports its location to the location analytics server 130 via the network 150. According to an illustrative embodiment, the locations of the mobile communication devices may be reported with a frequency that depends on various factors described in more detail below.

In addition to having location-tracking capabilities, each of the mobile communication devices 110A, 110B, 110C, 110D and 110E is equipped with presence-tracking capabilities. That is, each of the mobile communication devices 110A, 110B, 110C, 110D and 110E is able to transmit and receive short-range radio signals, e.g., Bluetooth signals, near field communication (NFC), and WiFi signals to and from other devices within a certain proximity. For example, mobile communication devices are able to receive Bluetooth signals from other devices that are within approximately 20-30 meters. Mobile communication devices are able to receive WiFi signals from other devices that are within approximately 40-60 meters. Mobile communication devices are able to receive NFC signals from other devices that are within less than approximately 20 meters. When a mobile communication device receives a radio signal emitted from another mobile communication device, this indicates a presence of the other mobile communication device within the proximity of the mobile communication device.

Referring again to FIG. 1, the mobile communication devices 110A, 110B, 110C, 110D, and 110E detect radio signals from the mobile communication devices that are present within a proximity, e.g., within an area in which short-range radio signals, such as WiFi, Bluetooth, and NFC signals, may be received. Based on the strength of the detected radio signals received from surrounding mobile communication devices within proximity, each mobile communication device determines the approximate locations of the surrounding mobile communication devices.

For example, a Bluetooth signal emitted by a mobile communication device is typically emitted with a power of approximately 2.5 mW. A WiFi and an NFC signal are typically emitted by a mobile communication device with a power of approximately 100 uW with a maximum power output of 100 mW. A mobile communication device which has been programmed in advance with information regarding the emission power of these short-range radio signals is able to determine an approximate distance to a nearby mobile communication device based on the signal strength of a signal received from the nearby mobile communication device. Then, the mobile communication device is able to determine the location of the nearby mobile communication device based on the location of the mobile communication device and the determined distance to the nearby mobile communication device.

For example, referring to FIG. 1, the mobile communication devices 110A, 110B, 110C, 110D, and 110E are surrounded by short-range radio signal areas 140A, 140B, 140C, 140D, and 140E, respectively. These radio signal range areas correspond to a distance from which each mobile communication device may receive short-range radio signals emitted by other mobile communication devices. These areas may be smaller or larger for different types of short-range radio signals. As the mobile communication devices 110A, 110B, 110C, 110D, and 110E move, so do the areas 140A, 140B, 140C, 140D, and 140E.

As can be seen from FIG. 1, the mobile communication device 110A may receive signals emitted from the mobile communication device 110B because the mobile communication device 110B is located within the area 140A surrounding the mobile communication device 110A. Also, the mobile communication device 110B may receive signals emitted from the mobile communication device 110A, because the mobile communication device 110A is located within the area 140B surrounding the mobile communication device 110B. Because the mobile communication devices 110A and 110B are able to receive short-range radio signals from each other, each of the mobile communication devices 110A and 110B may determine the location of the other mobile communication device based on the signal strength of the received short-range radio signal. Each of the mobile communication devices 110A and 110B may simultaneously report their locations and the locations of each other to the location analytics server 130 via, e.g., the Internet 150.

Similarly, the mobile communication device 110C may receive short-range radio signals emitted from the mobile communication device 110D, because the mobile communication device 110D is located within the area 140C surrounding the mobile communication device 110C, and the mobile communication device 110D may receive short-range radio signals emitted from the mobile communication device 110C, because the mobile communication device 110C is within the area 140D surrounding the mobile communication device 11 OD. Because the mobile communication devices 110C and 110D are able to receive short-range radio signals from each other, each of the mobile communication devices 110C and 110D may determine the location of the other mobile communication device based on the signal strength of the received short-range radio signal. Each of the mobile communication devices 110C and 110D may simultaneously report their locations and the location of each other to the location analytics server 130 via, e.g., the Internet 150.

As shown in FIG. 1, the mobile communication device 110E is located within the area 140E. While the mobile communication device 110E may report its location, there are no other mobile communication devices within the area 140E. Thus, the mobile communication device 110E does not report the location of another mobile communication device.

Though only five mobile communication devices 110A, 110B, 110C, 110D, and 110E are shown in FIG. 1 for simplicity of illustration, it should be appreciated that any number of mobile communication devices may detect short-range radio signals emitted by other mobile communication devices within a surrounding area and determine and report the locations of such devices. It can be seen that with a large number of mobile communication devices simultaneously reporting their locations and the locations of surrounding mobile communication devices, the amount of location information reported to the location analytics server 130 will be large. From a large volume of location information, the location analytics server 130 will be able to effectively perform location analytics, e.g., estimate crowd size, determine traffic flow, etc.

Although in the embodiment described above, the mobile communication devices 110A, 110B, 110C, 110D, and 110E report their locations and the locations of other mobile communication devices within a short-range radio area, it should be appreciated that the location information may be provided to the location analytics server 130 upon request. Also, the frequency with which the location information may be collected and reported may vary, based on different factors, described below. These factors may be taken into account by the mobile communication devices in determining how often to collect and report location information.

Location information may be collected and reported by a mobile communication device periodically, regardless of the location of the mobile communication device. As an alternative, location information may be collected and reported by a mobile communication device at intervals that depend upon the location of the mobile communication device.

For example, if the last-reported location of the mobile communication device is a predefined location, e.g., a home location, where the mobile communication device is unlikely to encounter many other mobile communication devices, the mobile communication device may collect and report location information every few hours or may not report location information at all until its location changes. This will save battery life of the mobile communication device. If the last-reported location of the mobile communication is at a location characterized as being crowded, such as a stadium, where there are likely to be many surrounding mobile communication devices, the mobile communication device may collect and report location information with more frequency, e.g., every few seconds.

The frequency with which the location information may be collected and reported may also depend on whether the location of the mobile communication device is static or dynamic. For example, if the location of mobile communication device is static, location information may be collected and reported less frequently than if the location of the mobile communication device is dynamic, as the mobile communication device may be less likely to collect and report new location information if it is not moving.

The determination of the frequency with which to collect and report location data may be made by the mobile communication device based on the above-mentioned factors. It should be appreciated that this determination may be overridden by a user manually indicating to the mobile communication device how often location data should be collected and reported.

Although the embodiments described above relate to sensing of short-range radio signals emitted by mobile communication devices, it should be appreciated that the locations of other devices emitting short-range radio signals may be collected and reported. For example, the location of a fixed communication device emitting short-range radio signals may be collected and reported by a mobile communication device.

A mobile communication device may distinguish whether a received short-range radio signal, such as a Bluetooth or WiFi signal, is emitted by a mobile communication device. For example, the receiving mobile communication device may match a mac address of the received signal with an International Mobile Subscriber Identity (IMSI) or a phone number, e.g., by communicating with a subscriber database within the cellular network or on the Internet. If there is a match, then the signal may be considered to have been emitted by a mobile communication device.

The mobile communication device may only report location information collected from nearby mobile communication devices or may report location information collected from nearby fixed communication devices depending, e.g., upon the needs of the location analytics server 130. The location analytics server 130 may indicate a desire for the location information it desires to receive to the mobile communication devices 110A, 110B, 110C, 110D, and 110E. If the location information of mobile and fixed communication devices is reported to the location analytics server 130, the information distinguishing which locations are for fixed devices and which locations are for mobile communication devices may also be reported.

Figure 2:
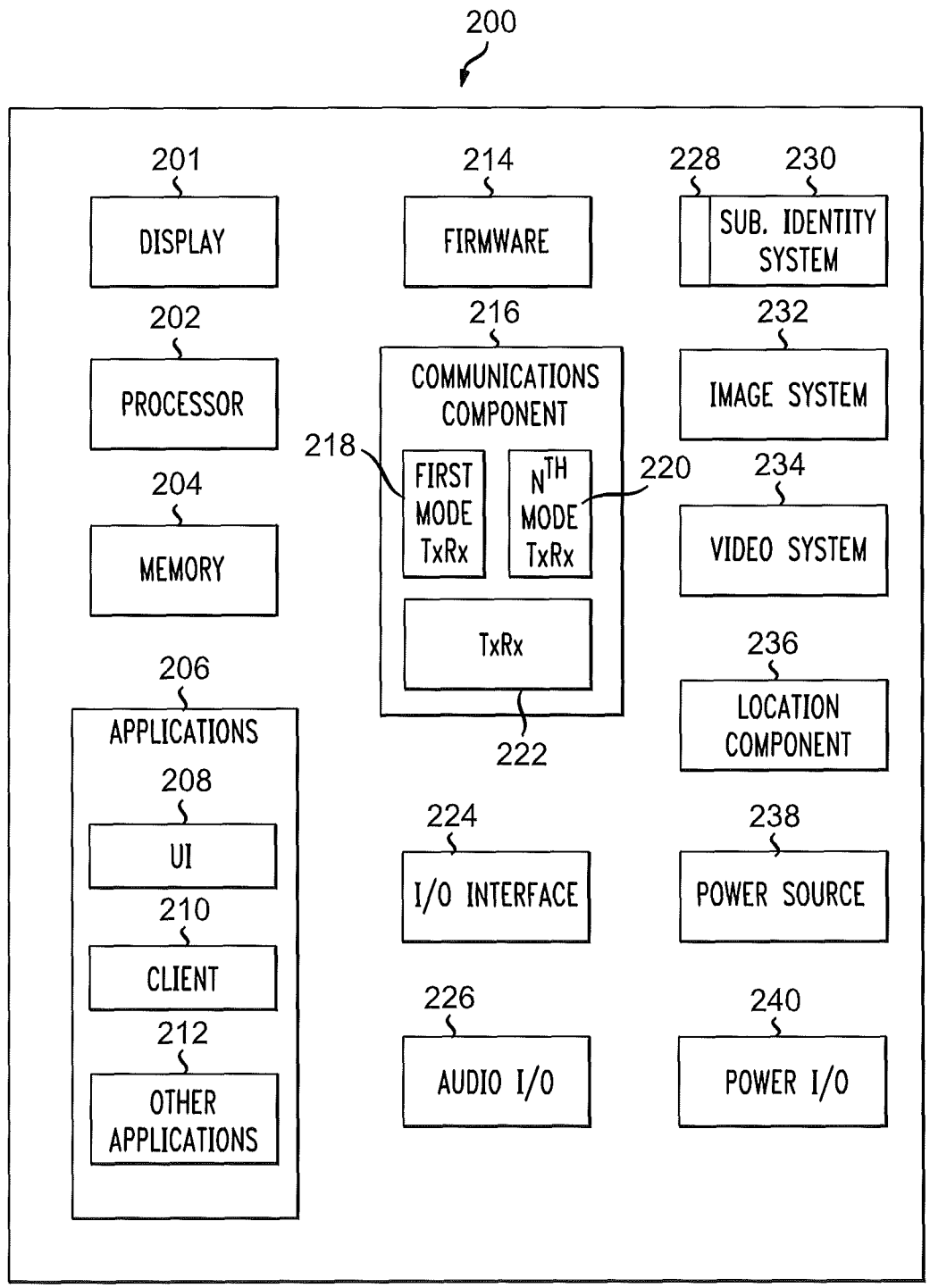
FIG. 2 illustrates a mobile communication device for collecting and reporting location information according to an illustrative embodiment.

FIG. 2 illustrates a schematic block diagram of an illustrative device 200 with which the mobile communication devices 110A, 110B, 110C, 110D, and 110E may be implemented, according to an illustrative embodiment. The device 200 may be a multimode handset and can include a variety of computer-readable media. Although no connections are shown between the components illustrated in FIG. 2, those skilled in the art will appreciate that the components can interact with each other via any suitable connections to carry out device functions.

The device 200 may include a display 201 for displaying multimedia, such as, for example, text, images, video, and telephone functions, such as Caller ID data, setup functions, menus, music metadata, messages, wallpaper, graphics, Internet content, device status, preference settings, and the like.

The device 200 may include a processor 202 for controlling and/or processing data. A memory 204 can interface with the processor 202 for the storage of data and/or applications 206. The applications 206 may include, for example, SMS messaging software, EMS message software, MMS messaging software, USSD software, a WAP browser, and the like. The data may include, for example, power emission levels for short-range radio signals emitted from mobile communication devices, data indicating the frequency with which location data should be collected and reported when the device is at a particular location, a particular type of location, when the device is moving, when the device is static, etc.

The applications 206 may also include a user interface (UI) application 208. The UI application 208 can interact with a client 210 (e.g., an operating system) to facilitate user interaction with device functionality and data, for example, viewing received messages, answering/initiating calls, entering/deleting data, password entry and settings, configuring settings, address book manipulation, and the like. The UI application 208 may also interact with the client 210 to facilitate user input regarding the frequency with which the device 200 should collect and report location information. Such user interaction may be facilitated via, e.g., a keypad or a touchscreen included in the device 200 or communicating with the device via the I/O interface 224.

The applications 206 may include other applications 212, such as, for example, add-ons, plug-ins, email applications, music application, video applications, camera applications, location-based service (LSB) applications, power conservation applications, game applications, productivity applications, entertainment applications, combinations thereof, and the like, as well as subsystem and/or components. The other applications may also include applications for performing actions described above, such as determining the location of a nearby mobile communication device based on a signal strength of a short-range radio signal received from the device, determining with what frequency location data should be collected and reported, etc.

The applications 206 can be instructions contained on computer-readable media, excluding propagating signals and may be stored in the memory 204. The applications 206 may, alternatively, be stored in firmware components 214. The applications 206 may be executed by the processor 202. The memory 204 and/or firmware 214 can also store code for execution during initialization of the device 200.

A communications component 216 may interface with the processor 202 to facilitate wired/wireless communication with external systems including, for example, cellular networks, location systems; VoIP networks, local area networks (LAN's), wide area networks (WAN's), metropolitan area networks (MAN's), personal area networks (PAN's), and other networks, which may be implemented using WIFI, WIMAX, combinations and improvements thereof, and the like. The communications component 216 can also include a multimode communication subsystem for providing cellular communications via different cellular technologies. For example, a first cellular transceiver 218 can operate in one mode, for example, a Global System for Mobile communications (GSM) mode, and an Nth transceiver 220 can operate in a different mode, for example a Universal Mobile Telecommunications Systems (UMTS) mode. While only two transceivers 218, 220 are illustrated, it should be appreciated that a plurality of transceivers may be included.

Also, it should be appreciated that the device 200 may include a transceiver for operating in cellular modes other than GSM and UMTS. Such modes may operate according to standards for wireless networks that use any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers.

The communications component 216 may also include a transceiver 222 for other communication technologies, such as, for example, WIFI, WIMAX, BLUETOOTH, infrared, IRDA, NFC, RF, and the like. The communications components 216 may also facilitate reception from terrestrial radio networks, digital satellite radio networks; Internet based radio service networks, combinations thereof, and the like. The communications component 216 can process data from a cellular network, a corporate network, a home broadband network, a WIFI hotspot, and the like via an ISP, DSL provider, or broadband provider. The communications component 216 can be used to receive requests from the locations analytics server 130 via a mobile switch and a base station with which the device is registered.

An input/output (I/O) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combinations thereof, and the like. It should be appreciated that the I/O interface 224 can be used for communication between the device 200 and a network or local device instead of, or in addition to, the communications component 216.

Audio capabilities may be provided by an audio I/O component 226 that may include a speaker for the output of audio signals and a microphone to collect audio signals.

The device 200 can include a slot interface 228 for accommodating a subscriber identity system 230 such as, for example, a subscriber identity module (SIM) or universal SIM (USIM). The subscriber identity system 230 instead can be manufactured into the device 200, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

The device 200 can further include an image capture and processing system 232 (image system). Photos and/or videos can be obtained via an associated image capture subsystem of the image system 232, for example, a camera. The device 200 may also include a video system 234 for capturing, processing, recording, modifying, and or transmitting video content.

A location component 236 may be included to send and/or receive signals such as, for example, GPS data, A-GPS data, WIF/WIMAX and or cellular network triangulation data, combinations thereof, and the like. The location component 236 can interface with cellular network nodes, telephone lines, satellites (such as satellites 120A and 120B), location transmitters and/or beacons, wireless network transmitters and receivers, for example, WIFI hotspots, radio transmitters, combinations thereof and the like. The device 200 may obtain, generate, and/or receive data to identify its location or can transmit data used by other devices, to determine the device 200 location. The device 200 may also determine the locations of surrounding devices, as described above. The location of the device 200 and the locations of surrounding nearby communication devices can be stored locally in the device 200 and provided to the location analytics server 130 at regular intervals (depending on the various factors described above) or upon request.

The device 200 may also include a power source 238, such as batteries and/or other power subsystems (AC or DC). The power source 238 can interface with an illustrative power system or charging equipment via a power I/O component 240.

Figure 3:
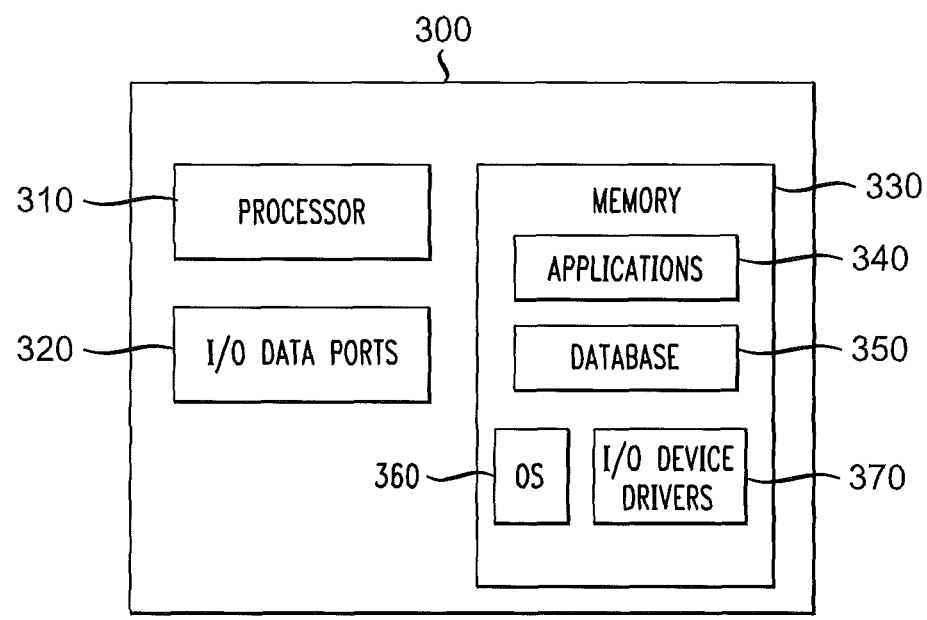
FIG. 3 illustrates a computing device for analyzing location data according to an illustrative embodiment.

FIG. 3 is a block diagram of a device 300 with which the location analytics server 130 may be implemented according to an illustrative embodiment. The device 300 includes a processor 310 that receives information, such as information indicating the locations of the mobile communication devices 110A, 110B, 110C, 110D, and 110E. This information is received via I/O Data Ports 320. The I/O Data Ports 320 can be implemented with, e.g., an interface including an antenna or other suitable type of transceiver through which data and signals may be transmitted and received.

The processor 310 communicates with a memory 330 via, e.g., an address/data bus (not shown). The processor 310 can be any commercially available or customer processor. The memory 330 is representative of the overall hierarchy of memory devices containing the software and data used to implement the functionality of the device 300. The memory 330 can include, but is not limited to, the following types of devices: processor registers, processor cache, RAM, ROM, PROM, EPROM, EEPROM, flash memory, SRAMD, DRAM, other volatile memory forms, and non-volatile, semi-permanent or permanent memory types; for example, tape-based media, optical media, solid state media, hard disks, combinations thereof, and the like, excluding propagating signals.

As shown in FIG. 3, the memory 330 may include several categories of software and data used in the device 300, including, applications 340, a database 350, an operating system (OS) 360, and the input/output (I/O) device drivers 370. As will be appreciated by those skilled in the art, the OS 360 may be any operating system for use with a data processing system. The I/O device drivers 370 may include various routines accessed through the OS 360 by the applications 340 to communicate with devices, and certain memory components. The applications 340 can be stored in the memory 330 and/or in a firmware (not shown) as executable instructions, and can be executed by the processor 310. The applications 340 include various programs that, when executed by the processor 310, implement the various features of the device 300, including applications for analyzing location data for purposes, such as crowd size estimation, traffic flow, etc. The applications 340 may be applied to data stored in the database 350, along with data, e.g., received via the I/O data ports 320, such as the location information received from the mobile communication devices 110A, 110B, 110C, 110D, and 110E. The database 350 represents the static and dynamic data used by the applications 340, the OS 360, the I/O device drivers 370 and other software programs that may reside in the memory 330.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

It should be understood that FIGS. 2 and 3 and the description above are intended to provide a brief, general description of a suitable environment in which the various aspects of some embodiments of the present disclosure can be implemented. While the description refers to computer-readable instructions, embodiments of the present disclosure also can be implemented in combination with other program modules and/or as a combination of hardware and software in addition to, or instead of, computer readable instructions. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like. The term "computer-readable media" and variants thereof, as used in the specification and claims, can include storage media, excluding propagating signals. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information.

Figure 4:
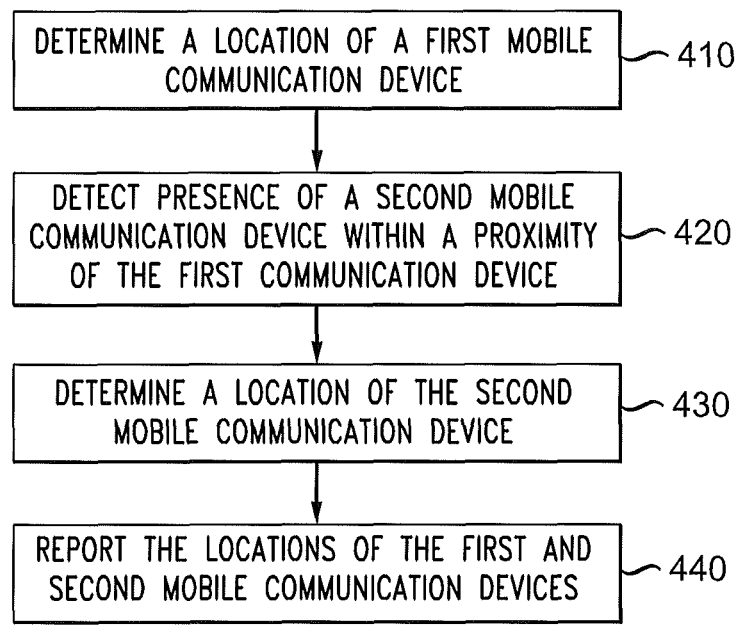
FIG. 4 illustrates a method for collecting and reporting location information according to an illustrative embodiment.

FIG. 4 illustrates a method for collecting and reporting location information according to an illustrative embodiment. For ease of explanation, the method is described with reference to two mobile communication devices. It should be appreciated, however, that this method may be carried out by any number of mobile communication devices.

Referring to FIG. 4, at step 410, a location of a first mobile communication device, e.g., mobile communication device 110A, is determined. The location may be determined by the mobile communication device 110A, based on signals received from the GPS satellite 120A, among other satellites. At step 420, the presence of a second mobile communication device, e.g., the mobile communication device 110B, within a proximity of the first mobile communication device is detected. The presence is detected by the first mobile communication device receiving a short-range radio signal emitted by the second mobile communication device. At step 430, the first mobile communication device, e.g., mobile communication device 110A, determines a location of the second mobile communication device, e.g., mobile communication device 110B. This determination may be based upon the signal strength of the received short-range radio signal. At step 440, the first mobile communication device, e.g., mobile communication device 110A, reports its location and the location of the second communication device, e.g., mobile communication device 110B, to the location analytics server 130. The locations may be reported simultaneously. The location analytics server 130, in turn, analyzes the location information for purposes, such as crowd size determination, traffic flow estimation, etc.

It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

The law does not require and it is economically prohibitive to illustrate and teach every possible embodiment of the present claims. Hence, the above-described embodiments are merely illustrations of implementations set forth for a clear understanding of the claimed subject matter. Variations, modifications, and combinations may be made to the above-described embodiments without departing from the scope of the claims. All such variations, modifications, and combinations are included herein by the scope of this disclosure and the following claims.

What is claimed is:

1. A method comprising:
   determining, by a first mobile communication device, a location of the first mobile communication device;
   detecting, by the first mobile communication device, presence of a second mobile communication device located within a proximity of the first mobile communication device;
   determining, by the first mobile communication device, a location of the second mobile communication device; and
   reporting, by the first mobile communication device, the location of the first mobile communication device and the location of the second mobile communication device, wherein determining the location of the first mobile communication device, determining the location of the second mobile communication device, and reporting the location of the first mobile communication device and the second mobile communication device are repeatedly performed at a particular location reporting update frequency, wherein the particular location reporting update frequency depends, at least in part, on a characterization of a crowd size associated with the location of the first mobile communication device such that when the location of the first mobile communication device is characterized as being associated with a large crowd size, the particular location reporting update frequency is higher than when the location of the first mobile communication device is characterized as being associated with a small crowd size.

2. The method of claim 1, wherein detecting the presence of the second mobile communication device comprises receiving a short-range radio signal from the second mobile communication device.

3. The method of claim 2, wherein determining the location of the second mobile communication device comprises determining the location of the second mobile communication device based on a signal strength of the short-range radio signal received from the second mobile communication device.

4. The method of claim 2, further comprising:
   after receiving the short-range radio signal from the second mobile communication device, determining whether an address associated with the short-range radio signal matches identification information stored on a subscriber database of a network; and
   in response to determining that the address associated with the short-range radio signal matches identification information stored on the subscriber database of the network,
      determining that the second mobile communication device emitting the short-range radio signal is a mobile communication device instead of a fixed communication device, and
      reporting, along with the location of the second mobile communication device, information indicating that the second mobile communication device is a mobile communication device.

5. The method of claim 1, wherein the particular location reporting update frequency further depends upon whether the location of the first mobile communication device is static or dynamic.

6. The method of claim 1, wherein the second mobile communication device determines the location of the second mobile communication device, detects presence of the first mobile communication device within a proximity of the second mobile communication device, determines the location of the first mobile communication device, and reports the location of the first mobile communication device and the location of the second mobile communication device.

7. A first mobile communication device comprising:
   a processor; and
   a memory having stored thereon instructions which, when executed by the processor, cause the processor to perform operations comprising:
      determining a location of the first mobile communication device,
      detecting presence of a second mobile communication device located within a proximity of the first mobile communication device,
      determining a location of the second mobile communication device, and
      reporting the location of the first mobile communication device and the location of the second mobile communication device, wherein determining the location of the first mobile communication device, determining the location of the second mobile communication device, and reporting the location of the first mobile communication device and the second mobile communication device are repeatedly performed at a particular location reporting update frequency, wherein the particular location reporting update frequency depends, at least in part, on a characterization of a crowd size associated with the location of the first mobile communication device such that when the location of the first mobile communication device is characterized as being associated with a large crowd size, the particular location reporting update frequency is higher than when the location of the first mobile communication device is characterized as being associated with a small crowd size.

8. The first mobile communication device of claim 7, wherein detecting the presence of the second mobile communication device comprises receiving a short-range radio signal from the second mobile communication device.

9. The first mobile communication device of claim 8, wherein determining the location of the second mobile communication device comprises determining the location of the second mobile communication device based on a signal strength of the short-range radio signal received from the second mobile communication device.

10. The first mobile communication device of claim 8, wherein the operations further comprise:
    after receiving the short-range radio signal from the second mobile communication device, determining whether an address associated with the short-range radio signal matches identification information stored on a subscriber database of a network; and
    in response to determining that the address associated with the short-range radio signal matches identification information stored on the subscriber database of the network,
       determining that the second mobile communication device emitting the short-range radio signal is a mobile communication device instead of a fixed communication device, and
       reporting, along with the location of the second mobile communication device, information indicating that the second mobile communication device is a mobile communication device.

11. The first mobile communication device of claim 7, wherein the particular location reporting update frequency further depends upon whether the location of the first mobile communication device is static or dynamic.

12. A computer-readable storage device storing instructions that, when executed by a processor of a first mobile communication device, cause the processor to perform operations comprising:
  determining a location of the first mobile communication device;
  detecting presence of a second mobile communication device located within a proximity of the first mobile communication device;
  determining a location of the second mobile communication device; and
  reporting the location of the first mobile communication device and the location of the second mobile communication device, wherein determining the location of the first mobile communication device, determining the location of the second mobile communication device, and reporting the location of the first mobile communication device and the second mobile communication device are repeatedly performed at a particular location reporting update frequency, wherein the particular location reporting update frequency depends, at least in part, on a characterization of a crowd size associated with the location of the first mobile communication device such that when the location of the first mobile communication device is characterized as being associated with a large crowd size, the particular location reporting update frequency is higher than when the location of the first mobile communication device is characterized as being associated with a small crowd size.

13. The computer-readable storage device of claim 12, wherein detecting the presence of the second mobile communication device comprises receiving a short-range radio signal from the second mobile communication device.

14. The computer-readable storage device of claim 13, wherein determining the location of the second mobile communication device comprises determining the location of the second mobile communication device based on a signal strength of the short-range radio signal received from the second mobile communication device.

15. The computer-readable storage device of claim 13, wherein the operations further comprise:
  after receiving the short-range radio signal from the second mobile communication device, determining whether an address associated with the short-range radio signal matches identification information stored on a subscriber database of a network; and
  in response to determining that the address associated with the short-range radio signal matches identification information stored on the subscriber database of the network,
    determining that the second mobile communication device emitting the short-range radio signal is a mobile communication device instead of a fixed communication device, and
    reporting, along with the location of the second mobile communication device, information indicating that the second mobile communication device is a mobile communication device.

16. The computer-readable storage device of claim 12, wherein the particular location reporting update frequency further depends upon whether the location of the first mobile communication device is static or dynamic.

\* \* \* \* \*